United States Patent Office 3,505,034
Patented Apr. 7, 1970

3,505,034
PROCESS OF PRODUCING DIHYDRIDOTETRACARBONYLOSMIUM AND CARBONYL AND HYDROGEN REPLACEMENT REACTIONS
François L'Eplattenier, Geneva, Switzerland, and Fausto Calderazzo, Fairfield County, Conn., assignors to American Cyanamid Company, Stamford, Conn., a corporation of Maine
No Drawing. Filed June 27, 1967, Ser. No. 649,116
Int. Cl. C01g 55/00; C07d 105/02
U.S. Cl. 23—360       16 Claims

ABSTRACT OF THE DISCLOSURE

Osmium pentacarbonyl or its cyclic trimer $Os_3(CO)_{12}$ is reacted with hydrogen to produce $OsH_2(CO)_4$ and this compound is reacted with trialkyl or triaryl phosphines or phosphites to replace carbonyl groups producing compounds or mixtures having the formula $$OsH_2(CO)_{4-n}[P(C_6H_5)_3]_n$$

in which $n$ is a positive integer less than 3. There is also described processes in which the hydrogens are replaced with chlorine or bromine by reaction with carbon tetrachloride or tetrabromide. The phosphorus containing products are new chemical compounds.

BACKGROUND OF THE INVENTION

There has been a demand for volatile complexes of osmium, for example, for the deposition of osmium mirrors and similar coatings by high temperature decomposition of osmium compounds carried by carrier gases. However, in the past this has not been practical because of the failure to produce by practical processes, volatile osmium complexes. In the past there has been observed in the production of osmium pentacarbonyl a small amount of a volatile constituent which was postulated to be dihydridotetracarbonylosmium, $OsH_2(CO)_4$. The evidence was not conclusive but it seems probable that the small amount of volatile material obtained as an impurity or byproduct may well have been this compound. Of course, the traces obtained did not constitute any practical or useful process in making the compound and so the problem of producing, by practical and economical processes, volatile osmium complexes was not satisfactorily solved.

SUMMARY OF THE INVENTION

The present invention includes a practical and economical process of producing $OsH_2(CO)_4$ by the reaction of hydrogen with osmium pentacarbonyl or its trimer $Os_3(CO)_{12}$. The reactions are as follows:

$$Os(CO)_5 + H_2 \rightarrow OsH_2(CO)_4 + CO$$

$$Os_3(CO)_{12} + 3H_2 \rightarrow 3OsH_2(CO)_4$$

The reactions take place by heating the osmium carbonyls under pressure, preferably in an inert liquid such as heptane or tetrahydrofuran, with hydrogen. The temperatures and pressures are not particularly critical. The reaction proceeds, for example, very effectively at temperatures about 100° C. and pressures of around 80 atmospheres. The reaction is practically quantitative no unreacted osmium pentacarbonyl remaining.

It is in no sense necessary that the osmium pentacarbonyl be separated or used in pure form and very economical processes involve heating osmium tetroxide with carbon monoxide and hydrogen in a suitable reaction medium such as heptane. Temperatures and pressures are in no sense critical but should be elevated. Thus, for example, temperatures may be from 100° to 200° C. with carbon monoxide and hydrogen in a ratio of 3 to 1. A suitable temperature is 160° C. and a suitable pressure 180 atmospheres. The yield is substantially quantitative but the reaction is not instantaneous, taking several hours to go to completion. It is also possible to react the osmium tetroxide with carbon monoxide and hydrogen in the absence of a solvent, but the liquid dispersion constitutes a simpler and more convenient operating procedure.

Instead of using osmium pentacarbonyl, the trimer $Os_3(CO)_{12}$ can be heated with hydrogen at 80 atmospheres and about 100° C. The reaction proceeds readily but the yield is not quite quantitative as is the case with the monomer.

The $OsH_2(CO)_4$ is stable against oxygen. However, during reaction it is desirable to eliminate oxygen and atmospheres of nitrogen are quite suitable for this purpose.

Investigations by means of nuclear magnetic resonance and infrared spectra are in agreement with a structure which is cis octahedral for $OsH_2(CO)_4$.

A similar compound is obtained by using deuterium instead of hydrogen. As would be expected there is a shift in metal-hydrogen stretching vibrations which shows in the infrared spectrum. A slight shift in the C—O stretching vibrations was also found. The deuterated compound, appears to have the same structure.

The invention also includes two types of reactions with $OsH_2(CO)_4$. The first type of reaction involves a replacement of carbonyl with phosphorus compounds such as trialkyl and triaryl phosphines and phosphites. When the reactions are effected with substantially stoichiometrical quantities only a single type of compound is produced but when an excess is present for example by using an excess of liquid tributyl phosphine, mixtures may be obtained containing one or two phosphorus containing groups. The compounds produced may be generally represented by the formulae $OsH_2(CO)_{4-n}[PR_3]_n$ and $$OsH_2(CO)_{4-n}[P(OR)_3]_n$$

in which $n$ is a positive integer less than 3 and R is a hydrocarbon radical.

The reactions with the phosphorus compounds proceed readily without any significant criticality of temperature, room temperatures may be used or higher temperatures which, of course result in somewhat faster reaction. There is no critical top limit although, of course, it is obvious that temperatures should not be used which result in decomposition of the complexes produced.

There are three possible isomeric structures for the complexes with a single phosphorus containing group, however nuclear magnetic resonance and infrared spectra exclude two of the three possibilities and therefore the general structure for these complexes is as follows:

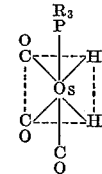

It will be seen that the structure is a cis structure which is not too surprising in light of the structure of the parent $OsH_2(CO)_4$. When the second phosphorus containing group is introduced nuclear magnetic resonance indicates that the formula is as follows:

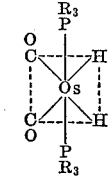

In other words the second phosphorus containing group enters the complex trans to the first.

The products obtained by substituting some carbonyls with the phosphorus compounds are new chemical compounds which are stable to oxygen and moisture and are useful as intermediates for producing other osmium containing compounds, and as organic compounds of extremely high molecular weight which can be used for certain radiographic purposes.

The $OsH_2(CO)_4$ is also capable of reacting with halogen containing compounds such as $CCl_4$ and $CBr_4$ which results in replacing the hydrogens with the halogen. The reaction is as follows:

$$OsH_2(CO)_4 + 2CX_4 \rightarrow 2CHX_3 + OsX_2(CO)_4$$

In which X stands for halogen. The reaction proceeds very rapidly even at temperatures below 0° C. and excellent operating conditions are represented by ordinary room temperature. In fact the temperature is not at all critical and any temperature can be used which is below the decomposition point of the products produced. The halogen substituted products are not new chemical compounds as they have been produced by carbonylation of osmium halide. However the process described above gives high yields and is very economical and so is included.

DESCRIPTION OF THE PREFERRED EMBODIMENTS

The invention will be described in conjunction with the following specific examples in which the parts are by weight unless otherwise specified.

Example 1.—$OsH_2(CO)_4$

Osmium tetroxide (0.5 g.) was introduced in the autoclave together with heptane (30 ml.). Carbon monoxide and hydrogen in a ratio 3:1 were then compressed to a total pressure of 180 atm. The autoclave was heated to 160° for about 6 hrs. After cooling to room temperature, the gases were vented and the volatile $OsH_2(CO)_4$ together with the solvent were then condensed in vacuo under exclusion of light into a flask maintained at Dry Ice temperature. The infrared spectrum of the colorless solution indicated the presence of traces of pentacarbonylosmium. The yield was substantially quantitative as indicated by the absence of any solid residue in the autoclave.

Example 2

The procedure of Example 1 was repeated but the heptane was eliminated. After the reaction had gone to completion the autoclave was cooled to −80° C. and any gas removed at low pressure, 20 mm. of mercury. The autoclave was then allowed to warm up to room temperature and the product distilled off and condensed to a colorless solid in a trap cooled to −80° C. At room temperature the product melts to a colorless liquid and is rather stable thermally and in the presence of air.

Example 3

A heptane solution of osmium pentacarbonyl containing small amounts of the dihyrdide was heated with hydrogen under a pressure of 80 atmospheres for about 6 hours at 100° C. The $OsH_2(CO)_4$ was recovered by distillation and the yield was practically quantitative, no unreacted osmium pentacarbonyl being detectable.

Example 4

The procedure of Example 3 was repeated with the trimer $Os_3(CO)_{12}$ and $OsH_2(CO)_4$ was obtained in yields slightly less than in Example 3.

Example 5

The procedures of Examples 1 and 2 were repeated replacing the hydrogen with deuterium. The same practically quantitative yields were obtained of the corresponding compound $OsD_2(CO)_4$.

Example 6

20 ml. of a heptane solution of $OsH_2(CO)_4$ containing about two millimoles was reacted with an equimolecular quantity of triphenylphosphine at room temperature, the triphenylphosphine being gradually added. The reaction was carried out in the absence of actinic light and was completed by heating for about four hours to about 80° C. The reaction mixture was then cooled and colorless crystals separated out. They were recovered by decanting off the solution and recrystalized from heptane. Analysis and investigation by infrared and nuclear magnetic resonance showed that the compound had the following formula $OsH_2(CO)_3P(C_6H_5)_3$. In the solid state the compound is stable to oxygen and moisture and is soluble in hydrocarbons such as heptane and benzene and in tetrahydrofuran it has a melting point, uncorrected, of 148–1490 C. The structural formula is as follows:

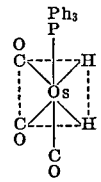

Example 7

The procedure of Example 6 was repeated substituting the corresponding amount of $OsD_2(CO)_4$. The corresponding dideuteride compound was produced in excellent yield. It had the same melting point and from infrared and data had the same structure.

Example 8

Procedure of Example 6 was repeated subsitituting the corresponding quantity of tri-n-butylphosphine for the triphenylphosphine. Substantially quantitative yields of the corresponding butylphosphine complex were obtained. Infrared and nuclear magnetic resonance indicated the same structural formula as in the triphenylphosphine compound.

Example 9

The procedure of Example 8 was repeated but the amount of tri-n-butylphosphine was increased by a factor of three. A product was obtained which is a mixture of the monosubstituted product of Example 8 and a disubstituted product which from nuclear magnetic resonance evidence had the formula:

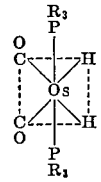

In which R, of course, stands for n-butyl.

Example 10

The procedure of Example 6 was repeated substituting the triphenylphosphine by an equivalent amount of triethylphosphite. A monosubstituted product was obtained in which the phosphite group took the place of the triphenylphosphine group of Example 6.

Example 11.—Dichlorotetracarbonylosmium $OsH_2(CO)_4$ prepared in accordance with Example 2 was reacted with carbon tetrachloride at room temperature, the carbon tetrachloride being in excess. The reaction proceeded very rapidly, colorless crystals precipitating out, which after separation, washing with heptane and sublimation at 60° C. under $10^{-3}$ mm. pressure, proved to be OsCl$_2$(CO)$_4$. The yield was good but not quantitative and the compound did not have a melting point without decomposition.

When the example was repeated at temperatures below 0° C. the same compound was obtained but the reaction rate was not quite as high as at room temperature.

Example 12.—Dibromotetracarbonylosmium

The procedure of Example 11 was repeated substituting the corresponding amount of carbon tetrabromide. In order to simplify the reaction, since the tetrabromide is not a liquid, the reaction was carried out in heptane solution. The reaction was very fast and a practically quantitative yield of OsBr$_2$(CO)$_4$ was obtained. This compound also did not have a melting point without decomposition.

Example 13

A heptane solution of osmium pentacarbonyl was treated with excess bromine at room temperature. This was followed by sublimation as described in the two preceding examples and the same product was obtained in excellent yields as in Example 11.

We claim:
1. A process of producing OsY$_2$(CO)$_4$ where Y is an element of atomic number 1, which comprises heating under pressure osmium pentacarbonyl with a molecule of an element of atomic number 1.
2. A process of producing OsH$_2$(CO)$_4$ which comprises heating under pressure osmium pentacarbonyl with hydrogen.
3. A process of producing OsY$_2$(CO)$_4$ wherein Y is an element of atomic number 1 which comprises reacting under pressure osmium tetroxide with carbon monoxide and an element of atomic number 1 in the approximate ratio of 3:1.
4. A process according to claim 3 in which the osmium tetroxide is dispersed in an excess of heptane.
5. A process according to claim 3 in which the osmium tetroxide is dispersed in an excess of tetrahydrofuran.
6. A process according to claim 1 in which Y is deuterium.
7. A process of producing a phosphorus complex [of OsH$_2$(CO)$_4$] selected from the group consisting of OsH$_2$(CO)$_{4-n}$[PR$_3$]$_n$ and OsH$_2$(CO)$_{4-n}$[P(OR)$_3$]$_n$ wherein:
  R is a hydrocarbon radical; and
  $n$ is a positive integer less than 3 which comprises reacting OsH$_2$(CO)$_4$ with a compound selected from the group consisting of PR$_3$ and P(OR)$_3$ wherein R is as defined above.
8. A process according to claim 7 in which the phosphorus group is triphenylphosphine.
9. A process according to claim 7 in which the phosphorus group is tri-n-butylphosphine.
10. A compound having the formula

$$OsY_2(CO)_{4-n}[PR'_3]_n$$

in which $n$ is a positive integer of less than 3, R$^1$ is selected from the group consisting of hydrocarbon radical and OR where R is a hydrocarbon radical and Y is an element of atomic number 1.
11. A compound according to claim 10 in which $n$ is 1.
12. A compound according to claim 11 in which R' is phenyl.
13. A compound according to claim 11 in which R' is $n$ butyl.
14. A process of producing OsX$_2$(CO)$_4$ in which X is halogen which comprises reacting OsH$_2$(CO)$_4$ with CX$_4$.
15. A process according to claim 14 in which X is chlorine.
16. A process according to claim 14 in which X is bromine.

References Cited

UNITED STATES PATENTS

| | | |
|---|---|---|
| 1,789,813 | 1/1931 | Gaus. |
| 3,037,999 | 6/1962 | Ihrman et al. _____ 260—429 |
| 3,345,144 | 10/1967 | Klopfer et al. _____ 23—367 |

FOREIGN PATENTS

| | | |
|---|---|---|
| 782,738 | 9/1957 | Great Britain. |
| 1,072,244 | 12/1959 | Germany. |
| 1,216,276 | 5/1966 | Germany. |

OTHER REFERENCES

Hiebeu et al.: Z. Anorg. Chem., vol. 240, p. 265 (1939).

OSCAR R. VERTIZ, Primary Examiner

H. S. MILLER, Assistant Examiner

U.S. Cl. X.R.
23—367; 260—429